United States Patent Office 3,525,557
Patented Aug. 25, 1970

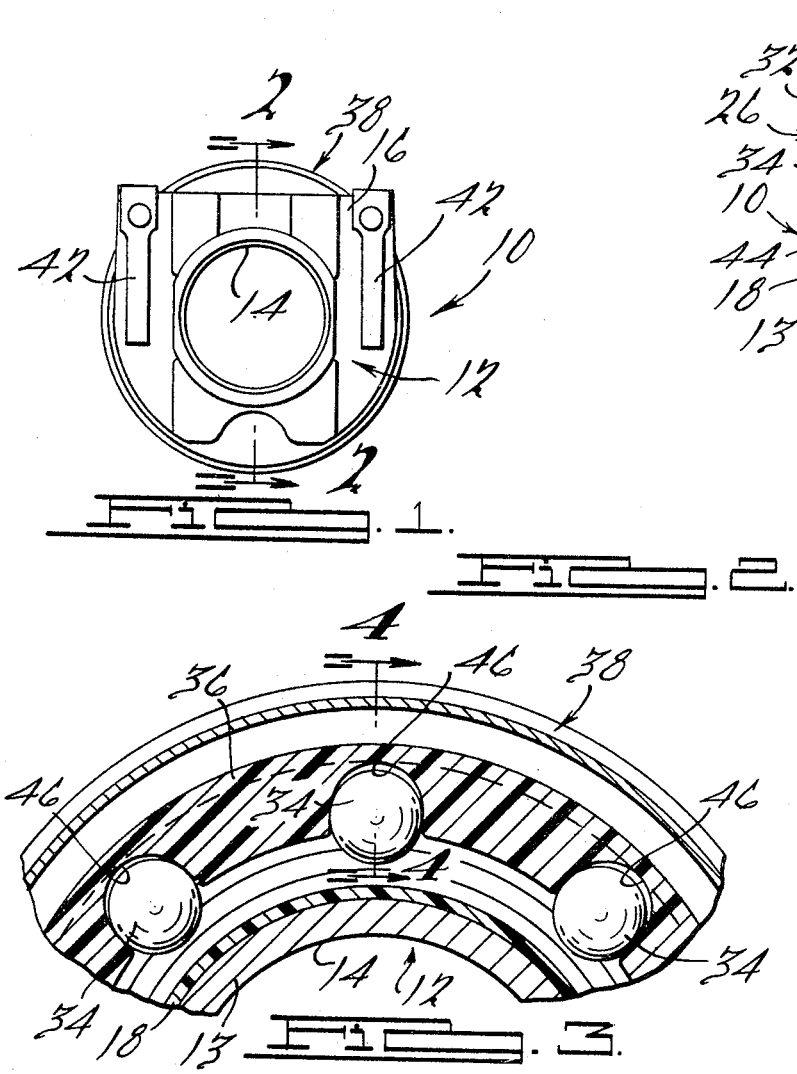
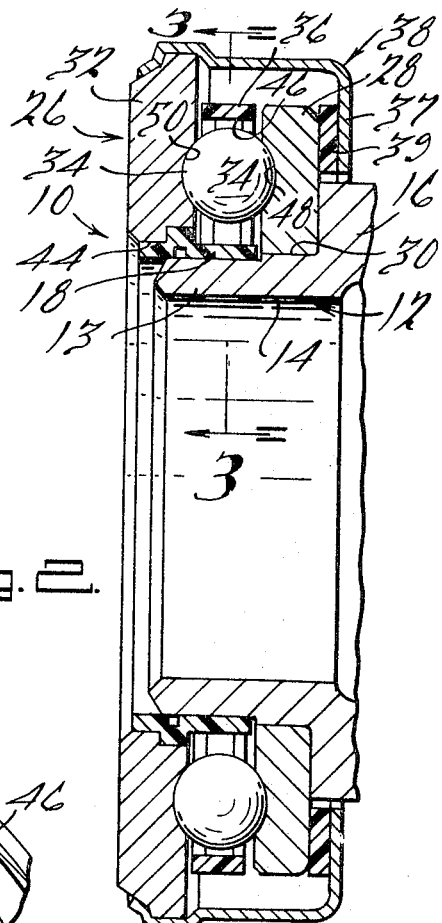
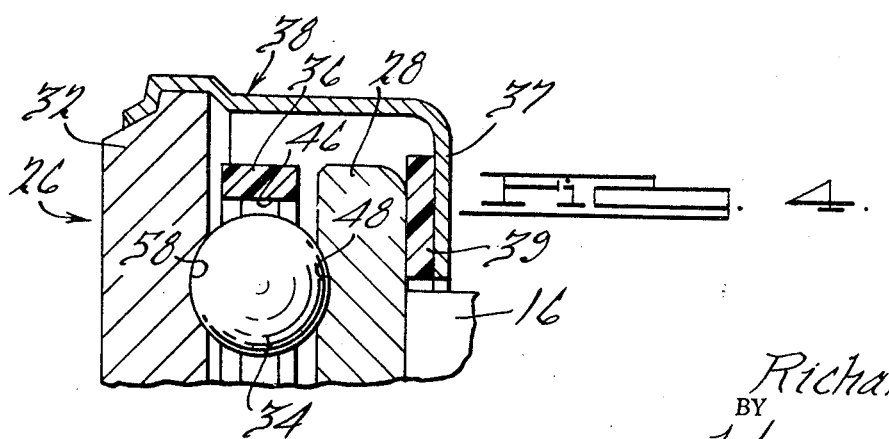

3,525,557
CLUTCH RELEASE BEARING
Richard G. Willing, Ann Arbor, Mich., assignor to Federal-Mogul Corporation, Southfield, Mich., a corporation of Michigan
Filed Apr. 8, 1968, Ser. No. 719,516
Int. Cl. F16c 19/10
U.S. Cl. 308—233      6 Claims

ABSTRACT OF THE DISCLOSURE

A clutch release bearing including a plastic washer to reduce wear and noise and a cage for co-operating with the washer to stop rotation when the bearing is unloaded.

---

The present invention relates to clutch release bearings.

It is an object of the present invention to provide a new and improved construction for a clutch release bearing.

In conventional clutch release bearings a housing is fixed to one race and has a flange which partially overlies the other race; when the bearing is unloaded it rotates rapidly and the flange and the race engage each other resulting in flange wear, noise, etc. In the present invention a wear ring or washer is located between the flange and race which eliminates the wear, noise, etc. Therefore it is another object of the present invention to provide a clutch release bearing in which a wear ring is provided which minimizes noise and housing wear. Along the same line it is also an object of the present invention to provide an improved clutch release bearing which is smoother in operation, is quieter and has a longer life.

It is a general object of this invention to provide an improved clutch release bearing.

In the present invention a cage is provided in which the balls can move radially outwardly when the bearing is unloaded whereby the races are moved apart causing engagement between the other race and the wear ring and the wear ring and the housing; this engagement tends to slow the rotation of the bearing on unloading and further aids the bearing life.

Therefore it is another object to provide an improved clutch release bearing having a cage constructed to reduce bearing speeds upon release of the bearing.

Other objects, features, and advantages of the present invention will become apparent from the subsequent description and the appended claims, taken in conjunction with the accompanying drawings, in which:

FIG. 1 is a front elevational view of a clutch release bearing assembly embodying the features of the present invention;

FIG. 2 is a sectional view, to enlarged scale, of the assembly of FIG. 1 taken substantially along the line 2—2;

FIG. 3 is a sectional view of the assembly of FIG. 2 taken substantially along the line 3—3; and FIG. 4 is a sectional view, to enlarged scale, of the bearing of FIG. 3 taken substantially along the line 4—4.

Looking now to the drawing, a clutch release bearing assembly is generally indicated by the numeral 10 and includes a body member 12 having a tubular portion 13 with a central bore 14 and a radially extending flange 16 at its rearward end. A thrust bearing assembly 26 has an axially inner race member 28 which is frictionally fixed to an annular seat 30 at the outer extremity of the body member 12 and which is axially spaced from an axially outer race member 32. A plurality of balls 34 which are held in a cage 36 are located between the races 28 and 32. An annular housing 38 is fixedly secured to the radially outer edge of the outer race 32 and generally extends over the balls 34 and cage 36 and has a radial flange 37 which extends over the rear race 28 whereby the race members 28, 32 are generally held together. The confines of the thrust bearing 26 are normally filled with a lubricant such as grease and an annular grease retaining ring 18 is attached to bore 44 of outer race 32. In conventional constructions flange 37 is engageable with inner race 28 and when bearing 26 is released from load the outer race 32 and housing 38 will spin rapidly with the above engagement resulting in noise and wear of the softer flange 37. In the present invention a wear ring 39 is located between flange 37 and inner race 28 whereby the noise and wear problem is eliminated. The wear ring or washer 39 is made of a material having good wear characteristics such as a phenolic resin. The phenolic also has good, reduced noise characteristics. With the use of the wear ring 39 a close or near zero clearance relation, i.e., less than the .004–.008 inch clearance for conventional construction, can be provided between race 28, wear ring 39 and flange 37 of housing 38. This close clearance enhances grease retention and further aids in noise reduction; in prior art constructions (without wear ring 39) such a close clearance relation would result in increased wear.

Noise and wear also are caused by the engagement of parts at high rotational speeds resulting when the thrust bearing is released. This is also minimized by the present invention. The retainer 36 is formed with a plurality of radially inwardly opening pockets 46 which receive the balls 34. The pockets 46 are radially oversized such that the balls 34 are retained with radial clearance. When bearing 26 is axially loaded, the balls 34 will be forced into the partially circularly contoured raceways 48 and 50 of race members 28 and 32, respectively, and hence will be in their desired, load bearing positions; however, upon removing the load from the bearing 26 the stored energy in the rotating parts will cause them to spin up faster. The centrifugal force on the balls 34 will move them radially outwardly into the clearance in slot 46. As this happens the balls 34 move radially out from raceways 48 and 50 and move the race members 28 and 32 axially apart bringing the race member 28, wear ring 39 and flange 37 into mutual engagement; this latter engagement has a braking effect minimizing the spin-up of the rotating parts resulting in reduced noise and wear and in longer life. The retainer 36 can be made of a suitable plastic which also aids in noise reduction.

A pair of clips 42 are riveted or otherwise secured to the flange 16 of the body member 12 and are utilized in a conventional manner to facilitate axial movement of the thrust bearing upon its associated shaft.

While it will be apparent that the preferred embodiment of the invention disclosed is well calculated to fulfill the objects above stated, it will be appreciated that the invention is susceptible to modification, variation and change without departing from the proper scope or fair meaning of the invention.

What is claimed is:
1. In a clutch release bearing assembly the improvement comprising: thrust bearing means for transmitting axial thrust loads, said bearing means including axially inner and outer race members, a plurality of anti-friction members located between said race members, a housing member fixed to one of said race members and having a radially extending flange in axial alignment with an axially outer surface of the other of said race members, and wear means located between and engageable with said flange and said outer surface for preventing direct engagement between said flange and said outer surface, said wear means being generally ring like in shape and having a generally flat engaging surface and being made of a material having good wear characteristics, said wear means being in a close clearance relationship between said flange and said outer surface.

2. In a clutch release bearing assembly the improvement comprising: thrust bearing means for transmitting axial thrust loads, said bearing means including axially inner and outer race members, a plurality of anti-friction members located between said race members, a housing member fixed to one of said race members and having a radially extending flange in axial alignment with an axially outer surface of the other of said race members, and wear means located between and engageable with said flange and said outer surface for preventing direct engagement between said flange and said outer surface, said wear means being generally ring like in shape and having a generally flat engaging surface and being made of a material having good wear characteristics retaining means for guiding said anti-friction members with radially outwardly extending clearance, said race members having raceways shaped to matingly receive said anti-friction members under thrust load conditions and to provide a preselected interference to movement of said anti-friction members radially into said clearance whereby movement of said anti-friction into said interference moves said race members apart and moves said flange, said wear means, and said outer surface into mutual engagement whereby spin-up after load release is minimized.

3. The apparatus of claim 2 with said anti-friction members being a plurality of ball members and with said retaining means comprising an annular retainer having a plurality of radially extending pockets being radially elongated to provide said clearance.

4. The apparatus of claim 2 with said wear means being in a close clearance relationship between said flange and said outer surface.

5. The apparatus of claim 4 with said wear means being a ring made of phenolic resin.

6. In a clutch release bearing assembly the improvement comprising: thrust bearing means for transmitting axial thrust loads, said bearing means including axially inner and outer race members, a plurality of anti-friction members located between said race members, a housing member fixed to one of said race members and having a radially extending flange in axial alignment with an axially outer surface of the other of said race members, and wear means located between and engageable with said flange and said outer surface for preventing direct engagement between said flange and said outer surface, said wear means being made of a material having good wear characteristics, retaining means for guiding said anti-friction members with radially outwardly extending clearance, said race members having raceways shaped to matingly receive said anti-friction members under thrust load conditions and to provide a preselected interference to movement of said anti-friction members radially into said clearance whereby movement of said anti-friction members into said interference moves said race members apart and moves said flange, said wear means, and said outer surface into mutual engagement whereby spin-up after load release is minimized, said anti-friction members being a plurality of ball members and with said retaining means comprising an annular retainer having a plurality of radially extending pockets being radially elongated to provide said clearance, said pockets of said retainer being opened at their radially inner ends.

References Cited

UNITED STATES PATENTS

| 1,402,458 | 1/1922 | Strom | 192—98 |
| 2,241,032 | 5/1941 | Horrocks | 308—233 |
| 3,272,576 | 9/1966 | Greby | 192—98 |
| 3,365,040 | 1/1968 | Pitner | 192—98 |

OTHER REFERENCES

Nylon-Clad Sleeve Bearings, published in Product Engineering, Mar. 3, 1958, pp. 52–54 relied upon.

FRED C. MATTERN, Jr., Primary Examiner

F. SUSKO, Assistant Examiner